(12) United States Patent
Ohe et al.

(10) Patent No.: US 11,492,486 B2
(45) Date of Patent: Nov. 8, 2022

(54) FLAME RETARDANT RESIN COMPOSITION

(71) Applicant: Sony Corporation, Tokyo (JP)

(72) Inventors: Takahiro Ohe, Tokyo (JP); Yasuhito Inagaki, Kanagawa (JP); Akito Kuriyama, Kanagawa (JP); Kenji Ueda, Kanagawa (JP); Kohei Shimizu, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 16/337,638

(22) PCT Filed: Jul. 26, 2017

(86) PCT No.: PCT/JP2017/027032
§ 371 (c)(1),
(2) Date: Mar. 28, 2019

(87) PCT Pub. No.: WO2018/066210
PCT Pub. Date: Apr. 12, 2018

(65) Prior Publication Data
US 2020/0032050 A1  Jan. 30, 2020

(30) Foreign Application Priority Data
Oct. 6, 2016 (JP) .................. JP2016-198290

(51) Int. Cl.
| C08L 69/00 | (2006.01) |
| C09K 21/10 | (2006.01) |
| C09K 21/12 | (2006.01) |
| C09K 21/14 | (2006.01) |
| B29B 17/02 | (2006.01) |

(52) U.S. Cl.
CPC ............. C08L 69/00 (2013.01); C09K 21/10 (2013.01); C09K 21/12 (2013.01); C09K 21/14 (2013.01); B29B 17/02 (2013.01); C08L 2201/02 (2013.01); C08L 2205/025 (2013.01); C08L 2205/03 (2013.01); C08L 2205/035 (2013.01); C08L 2207/20 (2013.01)

(58) Field of Classification Search
CPC ............... C08L 69/00; C08L 2205/025; C08L 2205/03; C08L 2205/035
See application file for complete search history.

(56) References Cited

U.S. PATENT DOCUMENTS

| 3,933,734 A * | 1/1976 | Mark ..................... C08K 5/42 |
| | | 524/160 |
| 8,440,758 B2 * | 5/2013 | Inagaki ................ C08G 64/42 |
| | | 524/500 |
| 10,508,239 B2 * | 12/2019 | Inagaki ............. C08G 63/6886 |
| 2004/0253405 A1 | 12/2004 | Inagaki |
| 2009/0306275 A1 * | 12/2009 | Inagaki ................... C08L 69/00 |
| | | 524/508 |
| 2011/0306712 A1 | 12/2011 | Inagaki |
| 2013/0237644 A1 * | 9/2013 | Xin ....................... C08K 5/0066 |
| | | 523/437 |
| 2014/0296383 A1 * | 10/2014 | Xin ........................ C08K 5/521 |
| | | 523/435 |
| 2015/0218370 A1 * | 8/2015 | Ueda ....................... C08K 3/34 |
| | | 524/166 |
| 2015/0274887 A1 * | 10/2015 | Isahaya ................. C08G 64/04 |
| | | 525/462 |
| 2015/0322261 A1 * | 11/2015 | Nakamoto ............. C08L 63/00 |
| | | 524/150 |
| 2016/0024299 A1 * | 1/2016 | Tomita .................... C08L 69/00 |
| | | 524/140 |

FOREIGN PATENT DOCUMENTS

| CN | 1572453 A | 2/2005 |
| CN | 102333821 A | 1/2012 |
| CN | 104955898 A | 9/2015 |
| EP | 2404968 A1 | 1/2012 |
| JP | 2004-351887 A | 12/2004 |
| JP | 2005-054085 A | 3/2005 |
| JP | 2005-298562 A | 10/2005 |
| JP | 2008-189766 A | 8/2008 |
| JP | 2012-126841 A | 7/2012 |
| JP | 2014-156588 A | 8/2014 |
| JP | 2014-231561 A | 12/2014 |
| WO | WO 2010/100865 A1 | 9/2010 |
| WO | WO-2014033987 A1 | 3/2014 |
| WO | 2014/119560 * | 8/2014 |

OTHER PUBLICATIONS

International Search Report and Written Opinion and English translation thereof dated Aug. 22, 2017 in connection with International Application No. PCT/JP2017/027032.

International Preliminary Report on Patentability and English translation thereof dated Apr. 18, 2019 in connection with International Application No. PCT/JP2017/027032.

* cited by examiner

Primary Examiner — Margaret G Moore
(74) Attorney, Agent, or Firm — Wolf, Greenfield & Sacks, P.C.

(57) ABSTRACT

To provide a flame retardant resin composition having excellent flame retardancy and excellent resin physical properties.

There is provided a flame retardant resin composition, including: an aromatic polycarbonate resin; an inorganic filler; a phosphate ester flame retardant; an organic sulfonic acid flame retardant; a drip preventing agent; and a polyorganosiloxane-containing graft copolymer, in which a content of the aromatic polycarbonate resin is 40 to 95 pts.mass to 5 to 60 pts.mass of the inorganic filler, and a content of the phosphate ester flame retardant, a content of the organic sulfonic acid flame retardant, a content of the drip preventing agent, and a content of the polyorganosiloxane-containing graft copolymer are respectively 1 to 30 pts.mass, 0.01 to 2.5 pts.mass, 0.05 to 1.5 pts.mass, and 0 to 10 pts.mass to the total 100 pts.mass of the aromatic polycarbonate resin and the inorganic filler.

13 Claims, No Drawings

FLAME RETARDANT RESIN COMPOSITION

CROSS-REFERENCE TO RELATED APPLICATIONS

This application claims the benefit under 35 U.S.C. § 371 as a U.S. National Stage Entry of International Application No. PCT/JP2017/027032, filed in the Japanese Patent Office as a Receiving Office on Jul. 26, 2017, which claims priority to Japanese Patent Application Number JP2016-198290, filed in the Japanese Patent Office on Oct. 6, 2016, each of which is hereby incorporated by reference in its entirety.

TECHNICAL FIELD

The present technology relates to a flame retardant resin composition.

BACKGROUND ART

In recent years, there is a demand for reduction in thickness and weight of a housing and the like of equipment in various fields, such as electrical/electronic apparatuses typified by home appliances, office automation (OA) equipment, and information/communication equipment. In order to meet such a demand, there is also a demand for improvement in mechanical strength of resin materials constituting these apparatuses.

A polycarbonate resin contained in a flame retardant resin composition is a resin having excellent mechanical properties, heat resistance, electrical properties, and the like, and is used as an engineering plastic such as an electrical/electronic apparatus material, an automobile material, an OA equipment material, and a residential material in a wide range of fields.

For example, Patent Literature 1 to 3 disclose a technology relating to a resin composition using a polycarbonate resin.

CITATION LIST

Patent Literature

Patent Literature 1: Japanese Patent Application Laid-open No. 2014-156588
Patent Literature 2: Japanese Patent Application Laid-open No. 2005-298562
Patent Literature 3: Japanese Patent Application Laid-open No. 2014-231561

DISCLOSURE OF INVENTION

Technical Problem

However, in the technologies proposed in Patent Literatures 1 to 3, there is a possibility that further improvement in flame retardancy or resin physical properties cannot be achieved.

In view of the above, it is a main object of the present technology to provide a flame retardant resin composition having excellent flame retardancy or excellent resin physical properties.

Solution to Problem

As a result of extensive research to solve the above-mentioned object, the present inventors have surprisingly succeeded in remarkably improving flame retardancy or resin physical properties by using an aromatic polycarbonate resin, an inorganic filler, a phosphate ester flame retardant, an organic sulfonic acid flame retardant, a drip preventing agent, and a polyorganosiloxane-containing graft copolymer in predetermined composition, and completed the present technology.

That is, in the present technology, there is provided a flame retardant resin composition, including: an aromatic polycarbonate resin; an inorganic filler; a phosphate ester flame retardant; an organic sulfonic acid flame retardant; a drip preventing agent; and a polyorganosiloxane-containing graft copolymer, in which a content of the aromatic polycarbonate resin is 40 to 95 pts.mass to 5 to 60 pts.mass of the inorganic filler, and a content of the phosphate ester flame retardant, a content of the organic sulfonic acid flame retardant, a content of the drip preventing agent, and a content of the polyorganosiloxane-containing graft copolymer are respectively 1 to 30 pts.mass, 0.01 to 2.5 pts.mass, 0.05 to 1.5 pts.mass, and 0 to 10 pts.mass to the total 100 pts.mass of the aromatic polycarbonate resin and the inorganic filler.

The aromatic polycarbonate resin contained in the flame retardant resin composition according to the present technology may include a recovered polycarbonate resin, and
a content of the recovered polycarbonate resin may be from 1 to less than 100 mass % to the total mass of the aromatic polycarbonate resin.

The aromatic polycarbonate resin may include a recovered polycarbonate resin.

The recovered polycarbonate resin may include at least one kind selected from the group consisting of a hydroxyl group, a phosphate group, a phosphate base, a sulfonium base, a diazonium base, an iodonium base, and a carboxyl group.

The recovered polycarbonate resin may include at least one kind selected from the group consisting of a polyolefin, polypropylene, and polyethylene.

The recovered polycarbonate resin may be obtained from at least one kind selected from the group consisting of an optical disk, an optical sheet, a headlight, a water bottle, a baby bottle, and a building material sheet.

The recovered polycarbonate resin may be obtained from a used optical disk or a waste optical disk to which an attached material is attached, the attached material being selected from the group consisting of a metal layer, a recording material layer, an adhesive layer, a label, and a surface-hardened layer.

The recovered polycarbonate resin may be obtained by separating and removing an attached material from a used optical disk or a waste optical disk to which the attached material is attached, the attached material being selected from the group consisting of a metal layer, a recording material layer, an adhesive layer, a label, and a surface-hardened layer.

The inorganic filler contained in the flame retardant resin composition according to the present technology may include at least one kind selected from the group consisting of glass fiber, a glass powder, mica, talc, and carbon fiber.

The organic sulfonic acid flame retardant contained in the flame retardant resin composition according to the present technology may include an organic sulfonic acid compound having a weight-average molecular weight of not less than 30,000 in terms of polystyrene.

The organic sulfonic acid compound may contain 0.1 to 10 mol % of a sulfonic acid group and/or a metal sulfonate group.

Advantageous Effects of Invention

In accordance with the present technology, it is possible to improve the flame retardancy or physical properties. It should be noted that the effect described here is not necessarily limitative and may be any effect described in the present technology.

MODE(S) FOR CARRYING OUT THE INVENTION

Hereinafter, favorable embodiments for carrying out the present technology will be described. The embodiments described below shows an example of a representative embodiment of the present technology so that the scope of the present technology is not narrowly interpreted. Note that description will be made in the following order.

Note that description will be made in the following order.
1. Overview of Present Technology
2. First Embodiment (Example of Flame Retardant Resin Composition)
   2-1. Flame Retardant Resin Composition
   2-2. Aromatic Polycarbonate Resin
   2-3. Inorganic Filler
   2-4. Phosphate Ester Flame Retardant
   2-5. Organic Sulfonic Acid Flame Retardant
   2-6. Drip Preventing Agent
   2-7. Polyorganosiloxane-Containing Graft Copolymer
   2-8. Other Components
   2-9. Method of Producing Flame Retardant Resin Composition
3. Second Embodiment (Example of Flame Retardant Resin Molded Article)
   3-1. Flame Retardant Resin Molded Article
   3-2. Method of Producing Flame Retardant Resin Molded Article

1. Overview of Present Technology

First, the overview of the present technology will be described.

The present technology relates to a flame retardant resin composition.

For example, in the technical fields of mobile electrical/electronic apparatuses typified by a laptop personal computer, a tablet terminal, a smart phone, and a mobile phone, a miniaturized/thinned housing and the like are being developed, and a material using a flame retardant resin composition is desired to have high flame retardancy and high rigidity even when it is thinned. Further, in order to perform thin-wall molding, it is also desired to have excellent fluidity and excellent impact resistance.

Therefore, at present, there is a need for a flame retardant resin composition excellent in flame retardancy, rigidity, fluidity, and impact resistance in the technical field, and research and development are actively carried out. For example, there are a technology of adding an inorganic filler such as glass fiber to improve rigidity and adding an impact modifier to improve impact resistance, and a method of using a copolymer in which a component that improves impact resistance is incorporated into a polycarbonate resin itself.

Regarding a flame retardant resin composition such as a polycarbonate resin and a polycarbonate resin composition, various other compositions have been developed and used in order to meet the demands from not only the field of the electrical/electronic apparatuses described above but also various fields. In such circumstances, a new viewpoint such as consideration for the environment has occurred, and it is becoming a world in which not only performance but also the environmental load is considered.

One means of considering the environment is using a recycled material such as a recovered polycarbonate resin. By collecting waste and used products from the production process and using/utilizing them for new products, it is possible to reduce introduction of new resources, crude oil mining, and energy for producing plastic from crude oil. Therefore, it attracts attention as a means of considering the environment.

In order to utilize a recycled material, for example, many technologies for treating additives contained in the recovered disk with chemicals to peel/remove the additives have been proposed. However, no matter how much washing/removing work is performed, residual impurities exist. In some cases, the influence of the residual impurities cannot be ignored depending on the application and desired flame retardancy of the recycled material.

It is generally known that the thinner the resin is, the more difficult it is to maintain high flame retardancy. For example, in the UL94V standard, a resin composition having flame retardancy of V-0 with a thickness of 2.0 mm often achieves only flame retardancy of V-2 with a thickness of 0.8 mm. Further, in the case where the thinned resin composition contains an inorganic filler typified by glass fiber, the flame retardant mechanism tends to be complicated.

Therefore, the thinned flame retardant resin composition having high rigidity needs advanced flame retardant formulation, and it is considered that the required flame retardancy can be maintained with delicate composition balance.

In the case of using a recycled material such as a recovered polycarbonate resin for such an advanced flame retardant resin composition to consider the environment, the residual impurities contained in the recycled material cause the residual flame at the time of burning and extinction to easily occur, which reduces the flame retardancy in some cases.

The present technology has been made under the circumstanced described above as a result of extensive research by the present inventors. The present technology is capable of providing a thinned flame retardant resin composition having high rigidity, which is prepared by using advanced flame retardant formulation in which an aromatic polycarbonate resin, an inorganic filler, a phosphate ester compound, a metal salt of an organic sulfonic acid, a drip preventing agent, and a polyorganosiloxane-containing graft copolymer are contained in predetermined composition. Further, the present technology is capable of providing also a flame retardant resin composition having excellent resin physical properties such as rigidity, fluidity, and impact resistance while having excellent flame retardancy without impairing the physical properties not only in the case where a recycled material such as a recovered polycarbonate resin is not used but also in the case where a recycled material such as a recovered polycarbonate resin is used.

2. First Embodiment (Example of Flame Retardant Resin Composition)

[2-1. Flame Retardant Resin Composition]

A flame retardant resin composition according to a first embodiment of the present technology is a flame retardant resin composition that contains an aromatic polycarbonate resin, an inorganic filler, a phosphate ester flame retardant, an organic sulfonic acid flame retardant, a drip preventing agent, and a polyorganosiloxane-containing graft copolymer, in which a content of the inorganic filler is 5 to 60 pts.mass to 40 to 95 pts.mass of an aromatic polycarbonate resin, and a content of the phosphate ester flame retardant, a content of the phosphate ester flame retardant, a content of the organic sulfonic acid flame retardant, a content of the drip preventing agent, and a content of the polyorganosiloxane-containing graft copolymer are respectively 1 to 30 pts.mass, 1 to 30 pts.mass, 0.01 to 2.5 pts.mass, 0.05 to 1.5 pts.mass, and 0 to 10 pts.mass to the total 100 pts.mass of the aromatic polycarbonate resin and the inorganic filler.

In accordance with the flame retardant resin composition according to the first embodiment of the present technology, effects of excellent flame retardancy and excellent resin physical properties are exerted. More specifically, the flame retardant resin composition according to the first embodiment of the present technology has excellent flame retardancy, and excellent resin physical properties such as excellent rigidity, excellent fluidity, and excellent impact resistance. Further, since the flame retardant resin composition according to the first embodiment of the present technology has excellent resin physical properties while having excellent flame retardancy, it is possible to achieve both effects of flame retardancy and resin physical properties.

[2-2. Aromatic Polycarbonate Resin]

The flame retardant resin composition of the first embodiment according to the present technology includes an aromatic polycarbonate resin. The aromatic polycarbonate resin may have a molecular weight of an arbitrary value, and the molecular weight may have a weight-average molecular weight (in terms of polystyrene) of 36,000 to 63,000.

The aromatic polycarbonate resin having the weight-average molecular weight (in terms of polystyrene) of 36,000 to 63,000 (which may be a composite of polycarbonate resins having different weight-average molecular weights, but a weight-average molecular weight of the composite is an arithmetic mean of the weight-average molecular weights) is used as a material for producing a flame retardant resin composition of the first embodiment according to the present technology or a molding-processed product of a flame-retardant polycarbonate resin, and is used for use applications of a casing material of an optical disc or a home electrical appliance. In general, an aromatic polycarbonate resin produced by the reaction between a dihydric phenol and a carbonate precursor can be used. Examples of the reaction method include interfacial polymerization, melt transesterification, solid-phase transesterification of carbonate prepolymer, and ring-opening polymerization of a cyclic carbonate compound. Those dihydric phenol and carbonate precursor are not particularly limited, and various materials can be used.

The aromatic polycarbonate resin may be polyester carbonate obtained by copolymerizing an aromatic dicarboxylic acid, for example, a terephthalic acid, an isophthalic acid, a naphthalenedicarboxylic acid, or a derivative thereof without impairing the gist of the present technology. Further, in order to improve the resin physical properties, the mechanical property, chemical property, or electrical property, other thermoplastic resins other than the A component can be blended. The blending amount of other thermoplastic resins varies depending on the type and aim thereof, but generally, is favorably 1 to 30 pts.mass and more favorably 2 to 20 pts.mass per 100 pts.mass of the aromatic polycarbonate resin. Examples of other thermoplastic resins include commodity plastics typified by a polyethylene resin, a polypropylene resin, a polyalkylmethacrylate resin, and the like, engineering plastics typified by a polyphenylene ether resin, a polyacetal resin, a polyamide resin, a cyclic polyolefin resin, a polyarylate resin (amorphous polyarylate, liquid-crystal polyarylate), and the like, and so-called super engineering plastics including polyetheretherketone, polyether-imide, polysulfone, polyethersulfone, polyphenylene-sulfide, and the like. Furthermore, thermoplastic elastomers such as an olefin-based thermoplastic elastomer, a polyamide-based thermoplastic elastomer, and a polyurethane-based thermoplastic elastomer can also be used.

(Aromatic Polycarbonate Resin Having Branching Structure)

The aromatic polycarbonate resin included in the flame retardant resin composition of the first embodiment according to the present technology may include an aromatic polycarbonate resin having a branching structure (branched aromatic polycarbonate resin).

The branched aromatic polycarbonate (PC) resin is not particularly limited as long as it is a branched aromatic polycarbonate resin. Examples of the branched aromatic polycarbonate resin include a branched aromatic polycarbonate, which has a branched core structure derived from the branching agent represented by the following formula (I) and has a viscosity-average molecular weight of 15,000 to 40,000, favorably 17,000 to 30,000, and more favorably 17,000 to 27,000, and in which the usage of the branching agent favorably is within the range of 0.01 to 3 mol %, and more favorably 0.1 to 2.0 mol %, to a dihydric phenol compound.

[Chemical 1]

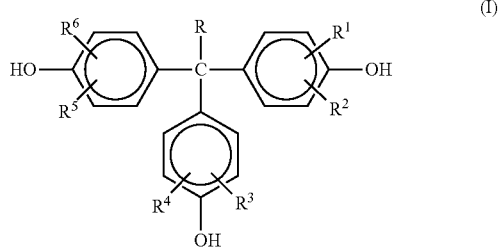

R represents hydrogen or an alkyl group having 1 to 5 carbon atoms, for example, a methyl group, an ethyl group, an n-propyl group, an n-butyl group, or an n-pentyl group. Further, R1 to R6 each independently represent hydrogen, an alkyl group having 1 to 5 carbon atoms (for example, methyl group, ethyl group, n-propyl group, n-butyl group, n-pentyl group, or the like), or an halogen atom (for example, chlorine atom, bromine atom, or fluorine atom).

More specifically, the branching agent represented by the general formula (I) is, for example, a compound including three or more functional groups, such as 1,1,1-tris(4-hydroxyphenyl)-methane; 1,1,1-tris(4-hydroxyphenyl)-ethane; 1,1,1-tris(4-hydroxyphenyl)-propane; 1,1,1-tris(2-methyl-4-hydroxyphenyl)-methane; 1,1,1-tris(2-methyl-4-hydroxyphenyl)-ethane; 1,1,1-tris(3-methyl-4-hydroxyphenyl)-methane; 1,1,1-tris(3-methyl-4-hydroxyphenyl)-ethane; 1,1,1-tris(3,5-dimethyl-4-hydroxyphenyl)-methane; 1,1,1-tris(3,5-dimethyl-4-hydroxyphenyl)-ethane; 1,1,1-tris(3-chloro-4-hydroxyphenyl)-methane; 1,1,1-tris(3-chloro-4-hydroxyphenyl)-ethane; 1,1,1-tris(3,5-dichloro-4-hydroxyphenyl)-methane; 1,1,1-tris(3,5-dichloro-4-hydroxyphenyl)-ethane; 1,1,1-tris(3-bromo-4-hydroxyphenyl)-methane; 1,1,1-tris(3-bromo-4-hydroxyphenyl)-ethane; 1,1,1-tris(3,5-dibromo-4- hydroxyphenyl)-methane; 1,1,1-tris(3,5-dibromo-4-hydroxyphenyl)-ethane, 4,4'-[1-[4-[1-(4-hydroxyphenyl)-1-methylethyl]phenyl]ethylidene]bisphenol; α,α',α''-tris(4-hydroxyphenyl)-1,3,5-triisopropylbenzene; 1-[α-methyl-α-(4'-hydroxyphenyl)ethyl]-4-[α',α'-bis(4''-hydroxyphenyl) ethyl]benzene; phloroglucin, trimellitic acid, or isatinbis(o-cresol). Of those, 1,1,1-tris(4-hydroxyphenyl)ethane is favorably used from the viewpoints of availability, reactivity, and economic efficiency.

Each of those branching agents may be used alone, or two or more kinds thereof may be used as a mixture. Further, when 1,1,1-tris(4-hydroxyphenyl)ethane is used as a branching agent, the usage thereof may be favorably 0.2 to 2.0 mol %, more favorably 0.3 to 2.0 mol %, still more favorably 0.4 to 1.9 mol % with respect to the dihydric phenol compound. When the usage is 0.2 mol % or more, the degree of freedom in blending increases. With the usage is 2.0 mol % or less, gelation hardly occurs during polymerization and hence the polycarbonate is easily produced.

The branched aromatic polycarbonate resin has a branched core structure derived from the branching agent represented by the general formula (I) described above and is specifically represented by the following formula.

[Chemical 2]

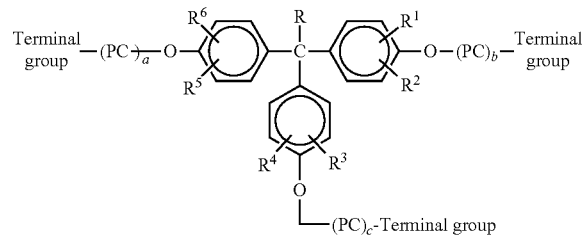

Here, in the formula, a, b, and c each represent an integer, and PC represents a polycarbonate moiety.

For example, when bisphenol A is used as a raw material component, PC represents a repeating unit represented by the following formula.

[Chemical 3]

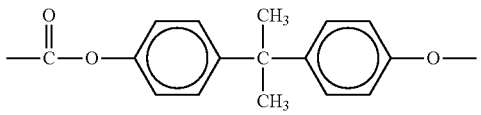

The amount (ratio) of the branched polycarbonate resin in the aromatic polycarbonate resin is favorably 10 to 100 mass %, more favorably 50 to 100 mass %. An effect of thin-wall flame retardancy may not be obtained unless the amount of the branched aromatic polycarbonate resin is 10 mass % or more.

(Aromaticpolycarbonate-Polyorganosiloxane Copolymer)

The aromatic polycarbonate resin included in the flame retardant resin composition of the first embodiment according to the present technology may include an aromatic polycarbonate-polyorganosiloxane copolymer.

The aromatic polycarbonate-polyorganosiloxane copolymer includes an aromatic polycarbonate moiety and a polyorganosiloxane moiety and includes an aromatic polycarbonate structural unit represented by the following general formula (V) and a polyorganosiloxane structural unit represented by the following general formula (VI).

[Chemical 4]

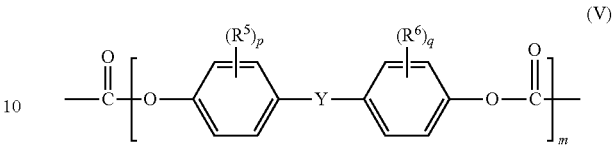

In the formula (V), $R^5$ and $R^6$ each represent a halogen atom, an alkyl group having 1 to 6 carbon atoms (favorably having 1 to 4 carbon atoms), or a phenyl group that may include a substituent, and when a plurality of R5 and R6 exist, the R5 and R6 may be identical or different from each other. Y represents a single bond, an alkylene group or alkylidene group having 1 to 20 carbon atoms (favorably having 2 to 10 carbon atoms), a cycloalkylene group or cycloalkylidene group having 5 to 20 carbon atoms (favorably having 5 to 12 carbon atoms), or an —O—, —S—, —SO—, —SO$_2$—, or —CO-bond, favorably isopropylidene group. p and q each represent an integer of 0 to 4 (favorably 0), and when a plurality of p and q exist, the p and q may be identical or different from each other. m represents an integer of 1 to 100 (favorably integer of 5 to 90). When m is 1 to 100, an appropriate viscosity-average molecular weight is obtained in the aromatic polycarbonate-polyorganosiloxane copolymer accordingly.

[Chemical 5]

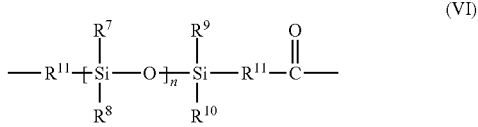

In the formula (VI), $R^7$ to $R^{10}$ each represent an alkyl group having 1 to 6 carbon atoms or a phenyl group that may include a substituent, and the $R^7$ to $R^{10}$ may be identical or different from each other. Specific examples of the $R^7$ to $R^{10}$ include an alkyl group such as a methyl group, an ethyl group, a propyl group, an n-butyl group, an isobutyl group, an amyl group, an isoamyl group, and a hexyl group and phenyl-based allyl such as a phenyl group, a tolyl group, a xylyl group, and a naphthyl group. $R^{11}$ represents an organic residue including fatty series and aromatic series, favorably a divalent organic compound residue such as an o-allyl phenol residue, a p-hydroxystyrene residue, and an eugenol residue.

As a manufacturing method of the aromatic polycarbonate-polyorganosiloxane copolymer, for example, aromatic polycarbonate oligomer and polyorganosiloxane having a reactive group at a terminal of a polyorganosiloxane part are dissolved into solvent such as methylene chloride, a catalyst such as triethylamine is used, dihydric phenol such as bisphenol A is added, and interfacial polycondensation reaction is performed. The aromatic polycarbonate-polyorganosiloxane copolymer is thereby manufactured. The aromatic polycarbonate-polyorganosiloxane copolymer is disclosed in, for example, Japanese Patent Application Laid-open No. H3-292359, Japanese Patent Application Laid-open No. H4-202465, Japanese Patent Application Laid-open No. H8-81620, Japanese Patent Application Laid-open No. H8-302178, Japanese Patent Application Laid-open No. H10-7897, and the like.

The polymerization degree of a structural unit of aromatic polycarbonate of aromatic polycarbonate-polyorganosiloxane copolymer is favorably 3 to 100. The polymerization degree of a structural unit of polyorganosiloxane is favorably approximately 2 to 500, more favorably approximately 2 to 300, and furthermore favorably approximately 2 to 140. Such aromatic polycarbonate-polyorganosiloxane copolymer is used. Further, the content of polyorganosiloxane of aromatic polycarbonate-polyorganosiloxane copolymer is generally in a range of approximately 0.1 to 10 mass %, and favorably 0.3 to 6 mass %. The viscosity-average molecular weight of aromatic polycarbonate-polyorganosiloxane copolymer used in a flame retardant resin composition of the first embodiment according to the present technology is generally approximately 5,000 to 100,000, favorably 10,000 to 30,000, and particularly favorably 12,000 to 30,000. Here, the viscosity-average molecular weight (Mv) of each of them may be obtained in a similar way to that of the polycarbonate resin.

(Recovered Polycarbonate Resin)

The aforementioned aromatic polycarbonate resin may be favorably a newly manufactured virgin material, may be favorably a waste material, a leftover material, a sprue material, a scrap, or the like generated in a manufacturing process, or may be favorably a recovered material or a waste material of a product (for example, optical disk (substrate) such as digital versatile disk (DVD), compact disk (CD), MO, MD, or Blu-ray disk (BD)).

In other words, the aromatic polycarbonate resin may include favorably a recovered polycarbonate resin in the range from 1 to less than 100 mass % to the total mass of the aromatic polycarbonate resin, or may be favorably a recovered polycarbonate resin.

The recovered polycarbonate resin may contain at least one kind selected from the group consisting of a hydroxyl group, a phosphate group, a phosphate base, a sulfonium base, a diazonium base, an iodonium base, and a carboxyl group, or at least one kind selected from the group consisting of a polyolefin, polypropylene, and polyethylene. It is favorable that the recovered polycarbonate resin is obtained from at least one kind selected from the group consisting of an optical disk, an optical sheet, a headlight, a water bottle, a baby bottle, and a building material sheet.

In a case that a recovered optical disk is used, it has various attached materials such as a metal reflecting layer, a plating layer, a recording material layer, an adhesive layer, or a label. However, in the flame retardant resin composition according to the first embodiment of the present technology, a recovered optical disk having such attached materials may be used as it is. Alternatively, such impurities and additional materials may be separated and removed from a recovered optical disk by using a known method, and the resultant material may be used.

Specific examples include a metal reflecting layer such as Al, Au, Ag, or Si, a recording material layer such as an organic pigment containing a cyanine series pigment, Te, Se, S, Ge, In, Sb, Fe, Tb, Co, Ag, Ce, or Bi, an adhesive layer including at least one kind or more of acrylic series acrylate, ether series acrylate, or vinyl series monomer, oligomer, or polymer, a label ink layer containing at least one kind of ultraviolet ray curable monomer, oligomer, or polymer, and polymerization initiator, colorant, or an adjuvant, and the like. The specific examples are not limited to them. The specific examples may include a film forming material and a coating material generally used in an optical disk. Note that, from a viewpoint of recycling, it is desirable to use a low-cost raw material. So it is preferable to reuse a resin containing impurities of various materials as it is. For example, optical disks are crushed minutely, optionally mixed with a predetermined additive material, and melted, and pellets are thereby manufactured. The pellets may be used as a PC resin raw material. Alternatively, depending on the structure of an injection molding device, recovered disks and various additive agents (described later) may be directly input together in a hopper or the like of the injection molding device, and a molded article made of a resin composition may be obtained. Note that, in a case that a PC resin without the aforementioned various impurities is used, attached materials such as a metal reflecting layer, a recording material layer, an adhesive layer, a surface-hardened layer, or a label may be removed by using a mechanical or chemical method disclosed in, for example, Japanese Patent Application Laid-open No. H6-223416, Japanese Patent Application Laid-open No. H10-269634, Japanese Patent Application Laid-open No. H10-249315, or the like.

By the way, the weight-average molecular weight of aromatic polycarbonate resin may be measured in terms of polystyrene by using a polystyrene molecular weight standard substance (sample) as a standard, by means of GPC (Gel Permeation Chromatography) measurement using chloroform solvent.

The molecular weight of aromatic polycarbonate resin may be an arbitrary value. However, the molecular weight of aromatic polycarbonate resin may be favorably 36000 to 63000 in weight-average molecular weight (in terms of polystyrene). The reason is as follows. If the weight-average molecular weight of aromatic polycarbonate resin is larger than 63000, the flowability (workability) of a melted flame-resistant resin composition, i.e., a resultant material, may sometimes tend to decrease. On the other hand, if the weight-average molecular weight of aromatic polycarbonate resin is smaller than 36000, the solvent resistance decreases, solvent cracks (cracks with chemical agent) may tend to occur sometimes, and the resistance to shock may tend to decrease sometimes.

From viewpoints of mechanical strength and moldability, the weight-average molecular weight of an aromatic polycarbonate resin contained in a flame retardant resin composition is more favorably 40,000 to 63,000, and furthermore favorably 43,000 to 62500.

[2-3. Inorganic Filler]

The inorganic filler contained in the flame retardant resin composition according to the first embodiment of the present technology is glass, talc, mica, or the like, and is widely used for filling resins. Examples of the inorganic filler include glass fiber, glass flake, a glass powder, talc, mica, wollastonite, kaolin, diatomaceous earth, calcium carbonate, calcium sulfate, barium sulfate, carbon fiber, carbon black, potassium titanate, and titanium oxide. Note that the inorganic filler may contain at least one kind selected from the group consisting of glass fiber, a glass powder, mica, talc, and carbon fiber.

Of these, fibrous fillers are favorably used. This is because it is possible to efficiently improve the rigidity by having a fibrous shape. It is more favorable to use glass fiber or carbon fiber as the inorganic filler used in the present invention. Of these, it is more favorable to use circular cross-sectional glass fiber, flat cross-sectional glass fiber, or glass flake. Note that the circular cross-sectional glass fiber and the flat cross-sectional glass fiber may be used alone or in combination.

The fiber length of the glass fiber is favorably not less than 0.5 mm and not more than 10 mm, more favorably 1.5 to 7 mm, and further favorably 2 to 5 mm in the shape before melt-kneading, which is the shape at the time of kneading preparation. Incidentally, it is generally known that the glass fiber is partially crushed at the time of melt-kneading in which a resin composition is produced, and the length is shortened. Therefore, it is conceivable that the fiber length of the glass fiber contained in pellet of a flame retardant resin composition and a molded article using a flame retardant resin composition is not less than 0.1 mm and not more than 3 mm.

The cross-sectional shape of the glass fiber may be either a circular cross section or a flat cross section. In the case of the circular cross section, the diameter is favorably not less than 3 μm and not more than 20 μm, more favorably not less than 7 μm and not more than 15 μm, and further favorably not less than 10 μm and not more than 13 μm.

In the case where the cross-sectional shape of the glass fiber is a flat cross section, the average major axis length of the fiber cross section may be not less than 7.5 μm and not more than 90 μm, favorably not less than 9.5 μm and not more than 70 μm, and further favorably not less than 10 μm and not more than 50 μm, and further favorably not less than 14 μm and not more than 45 μm, and the minor axis average value is favorably not less than 5 μm and not more than 15 μm, and more favorably not less than 6 μm and not more than 13 μm. Further, the ratio of the major axis to the minor axis (aspect ratio) may be 1.5 to 8, favorably 1.6 to 7, more favorably 1.7 to 6, and further favorably 1.8 to 5.

The cross-sectional shape of the flat cross-sectional glass includes not only a flat shape but also an oval shape, an elliptical shape, a cocoon shape, a trefoil shape, and a non-circular shape similar thereto. The glass fiber having the above-mentioned flat cross section may be used alone or in combination.

Glass flake is also favorably used as the inorganic filler. Glass flake having the average thickness of not less than 0.2 μm and not more than 10 μm may be used. It is favorable to use glass flake having the average thickness of not less than 0.3 μm and not more than 7 μm, and more favorably to use glass flake having the average thickness of not less than 0.5 μm and not more than 6 μm. Further, the average particle size of the glass flake is favorably not less than 10 μm and not more than 1000 μm, more favorably not less than 20 μm and not more than 700 μm, and further favorably not less than 50 μm and not more than 200 μm.

The above-mentioned glass inorganic filler such as glass fiber and glass flake, on which no surface treatment has been performed, may be used. Further, in order to improve the affinity with the aromatic polycarbonate resin, a glass inorganic filler on which surface treatment has been performed may be used. For example, by using glass fiber on which surface treatment has been performed with a silane coupling agent, a titanate coupling agent, or an aluminate coupling agent, it is possible to improve the adhesion to the aromatic polycarbonate resin, the mechanical strength, the long-term reliability of the aromatic polycarbonate resin, and the like.

As the glass inorganic filler such as glass fiber and glass flake, any known glass material such as A glass, C glass, E glass, and an alkali resistant glass composition containing a zirconia component can be used as long as it is a glass filler used for a thermoplastic resin. Among them, it is favorable to use alkali-free glass from the viewpoint of the thermal stability of the aromatic polycarbonate resin composition.

In the flame retardant resin composition according to the first embodiment of the present technology, a content of the inorganic filler is 5 to 60 pts.mass to 40 to 95 pts.mass of the aromatic polycarbonate resin. In the case where the total content of the aromatic polycarbonate resin and the inorganic filler is 100 pts.mass, from the viewpoint of improvement in rigidity, the content of the inorganic filler is favorably 10 (excluding) to 60 pts.mass, more favorably 20 to 60 pts.mass, further favorably 30 to 60 pts.mass, and particularly favorably 35 to 60 pts.mass. In the case where the total content of the aromatic polycarbonate resin and the inorganic filler is 100 pts.mass, when the content of the inorganic filler exceeds 60 pts.mass, the amount of the resin is too small. As a result, problems such as failure to secure fluidity during injection molding, conspicuous emergence of the inorganic filler on the surface of the molded product after molding, and a significant decrease in impact strength become conspicuous in some cases.

[2-4. Phosphate Ester Flame Retardant]

The flame retardant resin composition according to the first embodiment of the present technology contains 1 to 30 pts.mass of a phosphate ester flame retardant to the total 100 pts.mass of the aromatic polycarbonate resin and the inorganic filler. By containing 1 to 30 pts.mass of the phosphate ester flame retardant, it is possible to improve the flame retardancy of the flame retardant resin composition according to the first embodiment of the present technology. Further, by combining it with another additive to be described later, it is possible to achieve necessary flame retardancy.

The phosphate ester flame retardant may be a low molecular weight compound, an oligomer, or a polymer. The phosphate ester compound represented by the following general formula (1) is favorable.

[Chemical 6]

General formula (1)

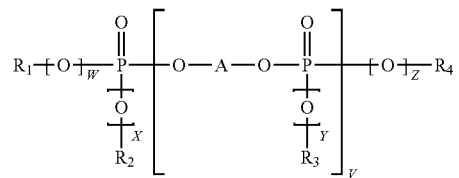

In the general formula (1), $R_1$, $R_2$, $R_3$, and $R_4$ each independently represent a hydrogen atom or an organic group, A represents a divalent or higher valent organic group, V represents an integer of 0 to 5, and W, X, Y, and Z each represent 0 or 1.

A may be a divalent arylene group, and is, for example, a divalent group derived from a dihydroxy compound such as resorcinol, hydroquinone, bisphenol A, 2,2'-dihydroxybiphenyl, 2,3'-dihydroxybiphenyl, 2,4'-dihydroxybiphenyl, 3,3'-dihydroxybiphenyl, 3,4'-dihydroxybiphenyl, 4,4'-dihydroxybiphenyl, 1,2-dihydroxynaphthalene, 1,3-dihydroxynaphthalene, 1,4-dihydroxynaphthalene, 1,5-dihydroxynaphthalene, 1,6-dihydroxynaphthalene, 1,7-dihydroxynaphthalene, 1,8-dihydroxynaphthalene, 2,3-dihydroxynaphthalene, 2,6-dihydroxynaphthalene, and 2,7-dihydroxynaphthalene. Among them, a divalent group derived from resorcinol, bisphenol A, or 3,3'-dihydroxybiphenyl is particularly favorable.

[2-5. Organic Sulfonic Acid Flame Retardant]

The flame retardant resin composition according to the first embodiment of the present technology contains 0.01 to 2.5 pts.mass of an organic sulfonic acid flame retardant to the total 100 pts.mass of the aromatic polycarbonate resin and the inorganic filler. Examples of the organic sulfonic acid flame retardant include an organic sulfonic acid flame retardant and an organic sulfonic acid metal salt flame retardant. It is favorable to contain an organic sulfonic acid compound having the weight-average molecular weight of not less than 30,000 in terms of polystyrene. Further, it is favorable that the organic sulfonic acid compound contains 0.1 to 10 mol % of a sulfonic acid group and/or a metal sulfonate group.

By containing the organic sulfonic acid flame retardant, formation of a char layer (carbonized layer) at the time of combustion is promoted, and the flame retardancy stability of the flame retardant resin composition according to the first embodiment of the present technology is improved. It is considered that the char layer generated at the time of combustion is firmly formed by the organic sulfonic acid flame retardant, and shutting off the oxygen from the outside can interrupt the supply of oxygen necessary for sustained combustion as described in WO2009/060986. Further, the organic sulfonic acid flame retardant serves as a catalyst to promote decomposition of the aromatic polycarbonate resin. At this time, carbon dioxide, that is, noncombustible gas is generated to suppress the combustion while bubbles are generated in the aromatic polycarbonate resin to suppress conduction of combustion heat.

Since sustained minute residual flame due to combustion of trace impurities can be suppressed in this way, it is possible to maintain the flame retardancy not only in the case of using a flame retardant resin composition using a pure aromatic polycarbonate resin but also in the case of using a recovered polycarbonate resin (e.g., a recycled material) containing trace impurities.

In the UL94 standard, the flame retardancy of V-0 needs extinction within 10 seconds after contact with flame for 10 seconds by a burner. In a resin composition having a large amount of the inorganic filler, a small flame is generated between the inorganic filler and the resin and a small residual flame tends to remain in a specimen particularly in the case of combustion with thin wall. Therefore, in order to achieve extinction within 10 seconds, a large amount of the above-mentioned phosphate ester flame retardant (e.g., phosphate ester compound) is often contained in the flame retardant formulation. However, an excessive amount of the phosphate ester compound affects the resin physical properties, e.g., the heat distortion temperature of the resin is lowered. Therefore, it is undesirable to add it more than necessary because a difference from the target physical properties is generated. Therefore, in order to achieve both the flame retardancy and the resin physical properties, exquisite composition formulation is often used in the flame retardant resin composition containing the inorganic filler.

A recovered polycarbonate resin (e.g., a recycled material) contains trace impurities in some cases. In this case, it can easily be imagined that when a recycled material is used as a raw material of a resin composition having a large amount of the inorganic filler, a small residual flame due to the trace impurities is generated in addition to a small flame generated by the influence of the inorganic filler, and thus the combustion time is prolonged by several to several ten seconds. Therefore, even the flame retardant composition having flame retardancy of V-0 does not satisfy the flame retardancy of V-0 (flame is not extinguished within 10 seconds) in the case of using a recycled material as a raw material in some cases.

In this case, for the purpose of achieving only the flame retardancy, it only needs to increase the added amount of the phosphate ester flame retardant (e.g., a phosphate ester compound) in some cases. However, as described above, when a phosphate ester compound is added to maintain necessary flame retardancy, the resin physical properties are changed.

It is known that adding a phosphate ester flame retardant acts in a way (toward the lower temperature) to lower the heat distortion temperature of the resin. In recent mobile products desired to have high rigidity with thin wall, as the performance increases, the amount of heat generation is increased, which makes the temperature of a part of the housing high. Therefore, it is not favorable that the heat distortion temperature is lowered.

Since the organic sulfonic acid flame retardant exhibits a flame retarding effect (formation of a char layer) with a small added amount, the effect on and change in the resin physical properties are negligibly small. The content thereof is 0.01 to 2.5 pts.mass, favorably 0.05 to 1.5 pts.mass, and more favorably 0.08 to 1.1 pts.mass to the total 100 pts.mass of the aromatic polycarbonate resin and the inorganic filler (B). This is because formation of the char layer is likely to be insufficient when it falls below 0.01 pts.mass, and the amount of residual components due to failure of formation of a char layer at the time of forming a char layer increases, resulting in sustained combustion and prolonged combustion time, when it exceeds 2.5 pts.mass.

The organic sulfonic acid metal base in the organic sulfonic acid metal salt flame retardant favorably contains an alkali metal element or an alkaline earth metal element. Examples of the alkali metal element include lithium, sodium, potassium, rubidium, and cesium. Examples of the alkaline earth metal element include beryllium, magnesium, calcium, strontium, and barium. More favorably, the alkali metal element is used. Among such alkali metal elements, rubidium and cesium, which have larger ionic radii, are favorable when transparency is highly desired. Meanwhile, they are not generic and difficult to purify, resulting in disadvantages in terms of cost in some cases. On the contrary, metals having small ionic radii such as lithium, potassium, and sodium may be disadvantageous in terms of flame retardancy in some cases. In consideration of these, the alkali metal element contained in the sulfonate base can be used properly. However, potassium, which is excellent in balance of properties, is most favorable in any respect. Such potassium and another alkali metal element may be used in combination.

The organic sulfonic acid flame retardant or organic sulfonic acid metal salt flame retardant is a flame retardant in which a sulfonic acid group and/or a metal sulfonate group is introduced into an aromatic polymer. The aromatic polymer contains a monomer unit having an aromatic skeleton in the range of 1 mol % to 100 mol %. The aromatic skeleton may be in a side chain or in the main chain. Specific examples of the aromatic polymer having an aromatic skeleton in a side chain include a polystyrene resin and an acrylonitrile resin, such as polystyrene (PS), high impact polystyrene (HIPS: styrene-butadiene copolymer), an acrylonitrile-styrene copolymer (AS), an acrylonitrile-butadiene-styrene copolymer (ABS), an acrylonitrile-chlorinated polyethylene-styrene resin (ACS), an acrylonitrile-styrene-acrylate copolymer (ASA), an acrylonitrile-ethylene propylene rubber-styrene copolymer (AES), and an acrylonitrile-ethylene-propylene-diene-styrene resin (AEPDMS). Any one or more of these can be used in combination. The aromatic polymer of the organic sulfonic acid flame retardant is favorably a polystyrene resin and/or an acrylonitrile styrene resin. Then, the weight-average molecular weight of the above-mentioned aromatic polymer having an aromatic skeleton in a side chain is favorably in the range of $1\times10^4$ to $1\times10^7$, more favorably in the range of $5\times10^4$ to $1\times10^6$, and further favorably in the range of $1\times10^5$ to $5\times10^5$.

In the aromatic polymer having an aromatic skeleton in a side chain, in the case where the weight-average molecular weight is out of the range of $1\times10^4$ to $1\times10^7$, it is difficult to substantially uniformly disperse the flame retardant in a resin to which a flame retardant is to be added, i.e., the compatibility is reduced, and the flame retardancy cannot be appropriately imparted to the flame retardant resin composition in some cases.

Further, examples of the aromatic polymer having an aromatic skeleton in the main chain include polycarbonate (PC), polyphenylene oxide (PPO), polyethylene terephthalate (PET), polybutylene terephthalate (PBT), and polysulfone (PSF). Any one or more of these can be used in combination. Further, these aromatic polymers having an aromatic skeleton in the main chain may be used as a mixture (alloy) obtained by mixing another resin or the like. Specific examples of the alloy with another resin include at least one of an ABS/PC alloy, a PS/PC alloy, an AS/PC alloy, a HIPS/PC alloy, a PET/PC alloy, a PBT/PC alloy, a PVC/PC alloy, a PLA (polylactic acid)/PC alloy, a PPO/PC alloy, a PS/PPO alloy, a HIPS/PPO alloy, an ABS/PET alloy, and a PET/PBT alloy.

In the aromatic polymer, the content of the monomer unit having an aromatic skeleton is in the range of 1 mol % to 100 mol %, favorably in the range of 30 mol % to 100 mol %, and further favorably in the range of 40 mol % to 100 mol %. In the case where the content of the monomer unit having an aromatic skeleton is less than 1 mol %, it is difficult to substantially uniformly disperse the flame retardant in a resin to which a flame retardant is to be added, or the introduction rate of the sulfonic acid group and/or the sulfonate base into the aromatic polymer is reduced, which makes it difficult to appropriately impart flame retardancy to the resin composition. Typical examples of the aromatic skeleton constituting the aromatic polymer include an aromatic hydrocarbons, an aromatic ester, an aromatic ether (phenols), an aromatic thioether (thiophenols), an aromatic amide, an aromatic imide, an aromatic amide imide, an aromatic ether imide, an aromatic sulfone, and an aromatic ether sulfone. Examples thereof include those having a cyclic structure such as benzene, naphthalene, anthracene, phenanthrene, and coronene. Among these aromatic skeletons, a benzene ring structure or an alkylbenzene ring structure is most common.

Examples of the monomer unit other than the aromatic skeleton contained in the aromatic polymer include, but not particularly limited to, acrylonitrile, butadiene, isoprene, pentadiene, cyclopentadiene, ethylene, propylene, butene, isobutylene, vinyl chloride, α-methylstyrene, vinyl toluene, vinyl naphthalene, acrylic acid, acrylic ester, methacrylic acid, methacrylate, maleic acid, fumaric acid, and ethylene glycol. Any one or more of these is used. Further, for the aromatic polymer, for example, a recovered used material or a waste material discharged in a factory can be used. That is, by using a recovered material as a raw material, cost reduction can be achieved.

By introducing a predetermined amount of the sulfonic acid group and/or the sulfonate base into the above-mentioned aromatic polymer, a flame retardant that can impart high flame retardancy when being contained in a resin to which a flame retardant is to be added is obtained. Then, examples of the method of introducing the sulfonic acid group and/or the sulfonate base into the aromatic polymer include a method of sulfonating an aromatic polymer with a predetermined amount of a sulfonating agent. As the sulfonating agent used for sulfonating the aromatic polymer in this case, for example, one containing less than 3% by weight of water. Specific examples of the sulfonating agent include anhydrous sulfuric acid, fuming sulfuric acid, chlorosulfonic acid, and polyalkylbenzenesulfonic acids. One or more of these is used in combination. Further, as the sulfonating agent, for example, a complex with a Lewis base such as an alkyl phosphate ester and a dioxane can also be used.

In the case of using 96% by weight of concentrated sulfuric acid or the like as the sulfonating agent, when producing a flame retardant by sulfonating an aromatic polymer, a cyano group in the polymer is hydrolyzed and converted to an amid group or a carboxyl group having a high water absorption effect, and a flame retardant containing the amide group or carboxyl group is produced. By using such a flame retardant containing a large amount of an amide group, a carboxyl group, or the like, high flame retardancy can be imparted to the resin composition. However, there is a possibility that the resin composition absorbs moisture from the outside over time, and is discolored to deteriorate the external appearance or cause troubles such as deterioration of the mechanical strength of the resin. Taking the above into consideration, as the method of performing sulfonation treatment on the aromatic polymer, for example, there is a method of adding a predetermined amount of a predetermined sulfonating agent to a solution in which the aromatic polymer is dissolved in an organic solvent (chlorine solvent) for reaction. In addition thereto, for example, there is a method of adding a predetermined amount of a predetermined sulfonating agent to a dispersion solution in which a powdery aromatic polymer is dispersed (not dissolved) in an organic solvent for reaction. Further, for example, there are also a method of putting an aromatic polymer directly in the sulfonating agent for reaction, and a method of spraying a sulfonation gas, i.e., sulfuric anhydride ($SO_3$) gas, directly on a powdery aromatic polymer for reaction. Among these methods, a method of spraying a sulfonation gas directly on a powdery aromatic polymer using no organic solvent for reaction is favorable.

Then, for example, it is introduced into the aromatic polymer, as a sulfonic acid group ($—SO_3H$), a sulfonate base, or in the state of being neutralized with ammonia or an amine compound. Specific examples of the sulfonate base include a sulfonic acid base a sulfonic acid Na base, a sulfonic acid K base, a sulfonic acid Li base, a sulfonic acid Ca base, a sulfonic acid Mg base, a sulfonic acid Al base, a sulfonic acid Zn base, a sulfonic acid Sb base, and a sulfonic acid Sn base. Note that a flame retardant is capable of imparting higher flame retardancy to a flame retardant resin composition when it is introduced into the aromatic polymer as a sulfonate base, as compared with the case where it is introduced into the aromatic polymer as a sulfonic acid group. Among them, a sulfonic acid Na salt, a sulfonic acid K salt, a sulfonic acid Ca salt, or the like is favorable.

As described above, the organic sulfonic acid compound favorably contains 0.1 to 10 mol % of the sulfonic acid group and/or the metal sulfonate group. Then, the introduction rate of the sulfonic acid group and/or the sulfonate base into the aromatic polymer can be adjusted by the added amount of the sulfonating agent, the reaction time of the sulfonating agent, the reaction temperature, the type and amount of the Lewis base, and the like. Among these methods, it is more favorable to perform the adjustment by the added amount of the sulfonating agent, the reaction time of the sulfonating agent, the reaction temperature, and the like. Specifically, the introduction rate of the sulfonic acid group and/or the sulfonate base into the aromatic polymer is favorably in the range of, in terms of the sulfur content, 0.1 to 2.5 mass %, more favorably 0.1 to 2.3 mass %, more favorably 0.1 to 2 mass %, particularly favorably 0.1 to 1.5 mass %. The lower limit of the sulfur content is favorably 1 mass %. Regarding the relationship between the introduction rate (mass %) and mol %, for example, in the case of polystyrene into which a sulfonic acid group is introduced (containing a sulfonic acid group), the content of the sulfonic acid group in polystyrene containing the sulfonic acid group is 1 mol % when the introduction rate (mass %) of the sulfonic acid group is 0.3 mass % in terms of the sulfur content. Further, although it is not in the favorable range of the introduction rate (mass %) described above, the content of the sulfonic acid group in polystyrene containing the sulfonic acid group is 100 mol % when the introduction rate (mass %) of the sulfonic acid group is 17.3 mass % in terms of the sulfur content, the content of the sulfonic acid group in polystyrene containing the sulfonic acid group is 10 mol % when the introduction rate (mass %) of the sulfonic acid group is 2.85 mass % in terms of the sulfur content, and the content of the sulfonic acid group in polystyrene containing the sulfonic acid group is 0.1 mol % when the introduction rate (mass %) of the sulfonic acid group is 0.03 mass % by mass in terms of the sulfur content. In the case where the total introduction rate of the sulfonic acid group and the sulfonate base into the aromatic polymer is less than 0.1 mass %, it is difficult to impart flame retardancy to the resin composition in some cases. Meanwhile, in the case where the total introduction rate of the sulfonic acid group and the sulfonate base in to the aromatic polymer is larger than 2.5 mass %, the compatibility with the aromatic polycarbonate resin is reduced, or the mechanical strength of the flame retardant resin composition is deteriorated over time.

The introduction rate of the sulfonic acid group and/or the sulfonate base into the aromatic polymer can be easily obtained by, for example, quantitatively analyzing the sulfur (S) component contained in the sulfonated aromatic polymer by a combustion flask method or the like.

[2-6. Drip Preventing Agent]

A drip preventing agent contained in the flame retardant resin composition according to the first embodiment of the present technology is used for suppressing a dripping phenomenon in the resin composition at the time of combustion, and is favorably a fluorine polymer, particularly favorably a fluoroolefin resin. Specific examples of this fluoroolefin resin include a difluoroethylene polymer, a tetrafluoroethylene polymer, a tetrafluoroethylene-hexafluoropropylene copolymer, a copolymer of tetrafluoroethylene and an ethylene monomer, a partially fluorinated polymer as shown in U.S. Pat. No. 4,379,910, and a polycarbonate resin produced from fluorinated diphenol. Among them, polytetrafluoroethylene (hereinafter, referred to as PTFE in some cases) is favorable. They may be used alone or in combination. By mixing and using fluorinated polyolefins having different polymerization degrees, handling as a raw material is improved, e.g., agglomeration can be suppressed, in some cases. Among fluoropolymers and fluoroolefin resins, those having fibril-forming ability are more favorable. The PTFE having fibril-forming ability has an extremely high molecular weight, and tends to be bound to each other by external action such as shear force to form fibrous. The molecular weight is 1,000,000 to 10,000,000, more favorably 2,000,000 to 9,000,000 in number average molecular weight obtained from the standard specific gravity. Not only PTFE having a solid form but also PTFE in the form of aqueous dispersion can be used. Further, in order to improve the dispersibility in the resin and achieve further favorable flame retardancy and mechanical properties, a PTFE mixture in the form in which the PTFE having fibril-forming ability and another resin are mixed can be used. Examples of a commercially available product of the PTFE having fibril-forming ability include Teflon (registered trademark) 6J of Chemours-Mitsui Fluoroproducts Co., Ltd. and Polyflon MPA FA500 and F-201L of DAIKIN INDUSTRIES, LTD. Typical examples of a commercially available product of aqueous dispersion of PTFE include Fluon AD-1 and AD-936 manufactured by AGC Chemicals, Fluon D-1 and D-2 manufactured by DAIKIN INDUSTRIES, LTD., and Teflon (registered trademark) 30J manufactured by Chemours-Mitsui Fluoroproducts Co., Ltd.

The content of the fluoroolefin resin in the flame retardant resin composition is favorably 0.1 to 0.5 mass %. By setting the content of the fluoroolefin resin to not less than 0.1 mass %, it is possible to suppress a dripping phenomenon. By setting the content of the fluoroolefin resin to not more than 0.5 mass %, the cost is not increased, the effect of suppressing the dripping phenomenon is maximized, and the mechanical strength and the flowability of the resin are not reduced.

[2-7. Polyorganosiloxane-Containing Graft Copolymer]

The flame retardant resin composition according to the first embodiment of the present technology contains 0 to 10 pts.mass of a polyorganosiloxane-containing graft copolymer to the total 100 pts.mass of the aromatic polycarbonate resin and the inorganic filler. By containing a polyorganosiloxane-containing graft copolymer as described above, it is possible to further improve the flame retardancy, fluidity, and impact resistance of the polycarbonate resin composition.

The polyorganosiloxane-containing graft copolymer is a graft copolymer obtained by graft-copolymerizing a rubbery polymer containing polyorganosiloxane and a monomer component that is copolymerizable therewith. As the method of producing the graft copolymer, any production method such as bulk polymerization, solution polymerization, suspension polymerization, and emulsion polymerization may be used. As the copolymerization method, single stage graft or multistage graft may be used. However, from the viewpoint of the productivity and easy control of particle size, an emulsion polymerization method is favorable, and a multistage emulsion polymerization method is more favorable.

The rubbery polymer containing polyorganosiloxane favorably has a glass transition temperature of usually not more than 0° C., favorably not more than −20° C., and further favorably not more than −30° C. Specific examples of the rubber component include polyorganosiloxane rubber and (IPN type) composite rubber formed of polyorganosiloxane rubber and polyalkyl acrylate rubber, although it is not particularly limited as long as it contains polyorganosiloxane rubber. They may be used alone or in combination.

Specific examples of the monomer component that is graft-copolymerizable with the rubber component include an epoxy group-containing (meth) acrylate compound such as an aromatic vinyl compound, a vinyl cyanide compound, a (meth) acrylate compound, a (meth) acrylic acid compound, and a glycidyl (meth) acrylate; a maleimide compound such as maleimide, N-methyl maleimide, and N-phenyl maleimide; and α, β-unsaturated carboxylic acid compound such as maleic acid, phthalic acid, and itaconic acid and anhydrides thereof (e.g., maleic anhydride). These monomer components may be used alone or in combination. Among them, from the viewpoint of the mechanical properties and surface appearance, an aromatic vinyl compound, a vinyl cyanide compound, or a (meth) acrylate compound is favorable. Specific examples of the (meth) acrylate compound include methyl (meth) acrylate, ethyl (meth) acrylate, butyl (meth) acrylate, cyclohexyl (meth) acrylate, and octyl (meth) acrylate.

The polyorganosiloxane-containing graft copolymer is favorably a core/shell graft copolymer type from the viewpoint of impact resistance and surface appearance. Among them, a core/shell graft copolymer in which at least one rubber component selected from polyorganosiloxane rubber and (IPN type) composite rubber formed of polyorganosiloxane rubber and polyalkyl acrylate rubber is used as a core layer and a shell layer is formed around the core layer, the shell layer being formed of at least one monomer component selected from an aromatic vinyl compound, a vinyl cyanide compound, and a (meth) acrylate compound, is particularly favorable. In the core/shell graft copolymer, those containing not less than 20 mass % of the rubber component are favorable, and those containing not less than 40 mass % of the rubber component are further favorable.

Examples of such a core/shell polyorganosiloxane-containing graft copolymer include "METABLEN (registered trademark; the same applies hereinafter) S-2001", "METABLEN S-2100", "METABLEN S-2030", and "METABLEN SX-005" manufactured by Mitsubishi Chemical Corporation, and "Kane Ace (registered trademark, the same applies hereinafter) MR-01", and "Kane ACE MR-02" manufactured by KANEKA CORPORATION.

The content of the polyorganosiloxane-containing graft copolymer is not less than 0 pts.mass and not more than 10 pts.mass, favorably not less than 0.5 pts.mass and not more than 8 pts.mass, more favorably not less than 1 pts.mass and not more than 6 pts.mass, and further favorably not less than 1 pts.mass and not more than 4 pts.mass to the total 100 pts.mass of the aromatic polycarbonate resin and the inorganic filler. In the case where the content of the polyorganosiloxane-containing graft copolymer (F) exceeds 10 pts.mass, reduction in flame retardancy or heat resistance, and poor appearance and turbidity of a molded article molded from the polycarbonate resin composition are likely to occur.

[2-8. Other Components]

The flame retardant resin composition according to the first embodiment of the present technology may further contain another component in addition to the aromatic polycarbonate resin, the inorganic filler, the phosphate ester flame retardant, the organic sulfonic acid flame retardant, the drip preventing agent, and the polyorganosiloxane-containing graft copolymer. Specifically, a resin composition a may contain an antioxidant (hindered phenol type, phosphorus type, or sulfur type), an antistatic agent, a UV absorbing agent (benzophenone type, benzotriazole type, hydroxyphenyl triazine type, cyclic imino ester type, or cyanoacrylate type), a light stabilizer, a plasticizer, a compatibilizer, a colorant (pigment, dye), a light diffusing agent, a light stabilizer, a crystal nucleating agent, an antimicrobial agent, a flow modifier, an infrared absorbing agent, a phosphor, a hydrolysis inhibitor, a release agent, a silicone surface treatment agent, or the like. As a result, the injection moldability, impact resistance, appearance, heat resistance, weather resistance, color, rigidity, and the like are improved.

[2-9. Method of Producing Flame Retardant Resin Composition]

The flame retardant resin composition according to the first embodiment of the present technology can be produced as follows. First, components (an aromatic polycarbonate resin, an inorganic filler, a phosphate ester flame retardant, an organic sulfonic acid flame retardant, a drip preventing agent, and a polyorganosiloxane-containing graft copolymer, and other components described above as necessary) are mixed. The mixing can be performed by using, for example, a Henschel mixer or a tumbler. At this time, the mixing is performed so that the components are dispersed uniformly. After that, the strand obtained when performing melt-kneading by a single screw or twin screw extruder or the like is cut with a pelletizer to produce pellets.

The flame retardant resin composition according to the first embodiment of the present technology can be produced as described above. Note that the flame retardant resin composition according to the first embodiment of the present technology is not limited to those processed into pellets, and includes those in the state in which the components are mixed (powder state or fluid state) and those processed into a form (sheet form or the like) different from the pellet.

3. Second Embodiment (Example of Flame Retardant Resin Molded Article)

[3-1. Flame Retardant Resin Molded Article]

The flame retardant resin composition according to the first embodiment of the present technology can be molded into various industrial products. Specifically, the housing or part material of various kinds of products such as electric appliances, automobile parts, information equipment, office equipment, telephone, stationery, furniture, and fiber, may be formed of the resin composition of the present invention. A flame retardant resin molded article formed of the flame retardant resin composition according to the first embodiment of the present technology has high flame retardancy, impact resistance, and rigidity as described above, and is suitable for thinning.

[3-2. Method of Producing Flame Retardant Resin Molded Article]

A flame retardant resin molded article according to the first embodiment of the present technology can be produced as follows, for example. The flame retardant resin composition according to the first embodiment of the present technology in the pellet form or the like described above is molded by using various kinds of molding/molding methods such as injection molding, injection compression molding, extrusion molding, blow molding, vacuum molding, press molding, foam molding, and supercritical molding to obtain a flame retardant resin molded article.

The present technology is not limited only to the embodiments and various modifications can be made without departing from the essence of the present technology.

Note that the effects described herein are merely examples and are not limited, and additional effects may be exerted.

Further, the present technology may take the following configurations.

[1]

A flame retardant resin composition, including:
an aromatic polycarbonate resin;
an inorganic filler;
a phosphate ester flame retardant;
an organic sulfonic acid flame retardant;
a drip preventing agent; and
a polyorganosiloxane-containing graft copolymer, in which a content of the aromatic polycarbonate resin is 40 to 95 pts.mass to 5 to 60 pts.mass of the inorganic filler, and a content of the phosphate ester flame retardant, a content of the organic sulfonic acid flame retardant, a content of the drip preventing agent, and a content of the polyorganosiloxane-containing graft copolymer are respectively 1 to 30 pts.mass, 0.01 to 2.5 pts.mass, 0.05 to 1.5 pts.mass, and 0 to 10 pts.mass to the total 100 pts.mass of the aromatic polycarbonate resin and the inorganic filler.

[2]

The flame retardant resin composition according to [1], in which the aromatic polycarbonate resin includes a recovered polycarbonate resin, and a content of the recovered polycarbonate resin is from 1 to less than 100 mass % to the total mass of the aromatic polycarbonate resin.

[3]

The flame retardant resin composition according to [1], in which the aromatic polycarbonate resin includes a recovered polycarbonate resin.

[4]

The flame retardant resin composition according to [2] or [3], in which the recovered polycarbonate resin includes at least one kind selected from the group consisting of a hydroxyl group, a phosphate group, a phosphate base, a sulfonium base, a diazonium base, an iodonium base, and a carboxyl group.

[5]

The flame retardant resin composition according to any one of [2] to [4], in which the recovered polycarbonate resin includes at least one kind selected from the group consisting of a polyolefin, polypropylene, and polyethylene.

[6]

The flame retardant resin composition according to any one of [2] to [5], in which the recovered polycarbonate resin is obtained from at least one kind selected from the group consisting of an optical disk, an optical sheet, a headlight, a water bottle, a baby bottle, and a building material sheet.

[7]

The flame retardant resin composition according to any one of [2] to [5], in which the recovered polycarbonate resin is obtained from a used optical disk or a waste optical disk to which an attached material is attached, the attached material being selected from the group consisting of a metal layer, a recording material layer, an adhesive layer, a label, and a surface-hardened layer.

[8]

The flame retardant resin composition according to any one of [2] to [5], in which the recovered polycarbonate resin is obtained by separating and removing an attached material from a used optical disk or a waste optical disk to which the attached material is attached, the attached material being selected from the group consisting of a metal layer, a recording material layer, an adhesive layer, a label, and a surface-hardened layer.

[9]

The flame retardant resin composition according to any one of [1] to [8], in which the inorganic filler includes at least one kind selected from the group consisting of glass fiber, a glass powder, mica, talc, and carbon fiber.

[10]

The flame retardant resin composition according to any one of [1] to [9], in which the organic sulfonic acid flame retardant includes an organic sulfonic acid compound having a weight-average molecular weight of not less than 30,000 in terms of polystyrene.

[11]

The flame retardant resin composition according to [10], in which the organic sulfonic acid compound contains 0.1 to 10 mol % of a sulfonic acid group and/or a metal sulfonate group.

EXAMPLES

Hereinafter, effects of the present technology will be specifically described with reference to Examples. Note that the scope of the present technology is not limited to the Examples.

Flame retardant resin composition according to Examples 1 to 24 and flame retardant resin composition according to Comparative Examples 1 to 16 were prepared, and the respective flame retardant resin compositions were evaluated.

Configuration of Flame Retardant Resin
Compositions According to Examples 1 to 24 and
Comparative Examples 1 to 16

Each component constituting the flame retardant resin compositions according to Examples 1 to 24 and Comparative Example 1 to 16 will be described. Note that components (A component, B component, C component, D component, E component, and F component) respectively correspond to the aromatic polycarbonate resin, the inorganic filler, the phosphate ester flame retardant, the organic sulfonic acid flame retardant, the drip preventing agent, and the polyorganosiloxane-containing graft copolymer described in the first embodiment.

(A Component: Aromatic Polycarbonate Resin)

A component: the following components A-1 to A-4 were used as the aromatic polycarbonate resin.

A-1: commercially available polycarbonate resin having a medium molecular weight (L-1225L: manufactured by TEIJIN LIMITED, weight-average molecular weight in terms of polystyrene (hereinafter, Mw in terms of PS) is 45,000)

A-2: pelletized polycarbonate resin (Mw in terms of PS: 32000) obtained by treating a used CD (Compact Disc), which has been pulverized (2 to 20 mm), with an alkaline hot aqueous solution to remove a coating layer (a recording material layer, a label, an adhesive layer, a hardened layer, a metallic reflective layer, and the like), and then melt-kneading it by a twin screw extruder.

A-3: PC resin (Mw in terms of PS: 60,000) recovered from a light blue used water bottle container A-4: polycarbonate resin (Mw in terms of PS: 46,000) pelletized after pulverizing a used optical sheet coarsely and then melt-kneading it by a twin screw extruder.

(B Component: Inorganic Filler)

B component: the following components B-1 to B-3 were used as the inorganic filler.

B-1: glass fiber: chopped strand

B-2: flat cross-sectional glass fiber: CSG 3PL-830, major axis of 28 μm, minor axis of 7 μm B-3: mineral powder: talc: FH105 (average median diameter: 5.0 μm, specific surface area: 40,000 to 45,000 cm2/g): FUJI TALC INDUSTRIAL CO., LTD.

(C Component: Phosphate Ester Flame Retardant)

C component: the following component C-1 was used as the phosphate ester flame retardant.

C-1: phosphorus flame retardant: CR-741: DAIHACHI CHEMICAL INDUSTRY CO., LTD., bisphenol A bis (diphenyl phosphate)

(D Component: Organic Sulfonic Acid Flame Retardant)

D component: the following components D-1 to D-2 were used as the organic sulfonic acid flame retardant.

D-1: styrene-potassium 4-vinylbenzene sulfonate copolymer (manufactured by Sony Corp.: PSS-K)

D-2: potassium metal salt of acrylonitrile styrene sulfonate (having the introduction rate of the sulfonic acid group and/or the sulfonate base into the aromatic polymer is 2.24% in terms of sulfur) (PASS-K)

(E Component: Drip Preventing Agent)

E component: the following component E-1 was used as the drip preventing agent.

E-1: commercially available PTFE (manufactured by DAIKIN INDUSTRIES, LTD.: POLYFLON FA500H) as polytetrafluoroethylene having fibril-forming ability (F Component: Polyorganosiloxane-Containing Graft Copolymer)

F component: the following components F-1 to F-3 were used as the polyorganosiloxane-containing graft copolymer.

F-1: METABLEN S-2030
F-2: METABLEN S-2001
F-3: METABLEN SX-005

[Molding of Flame Retardant Resin Composition]

The above-mentioned components (A component to F component) were blended at a formulation ratio shown in the following Table 1 (Examples 1 to 13), Table 2 (Comparative Examples 1 to 4), Table 3 (Examples 14 to 24), and Table 4 (Comparative Example 5 to Comparative Example 16), blended with a tumbler, and melt-kneaded using a co-rotating twin screw extruder ZE40A (Φ42, L/D=38) (manufactured by KraussMaffei Berstorff) to obtain pellets (flame retardant resin molded article). The obtained pellets were dried at 80° C., and molded using an injection molding machine at a cylinder temperature of 280° C. and a mold temperature of 80° C. to prepare a combustion specimen of 125 mm (length)×13 mm (width)×0.8 mm (thickness).

[Evaluation of Flame Retardancy]

(Method of Evaluating Flame Retardancy)

For evaluation of the flame retardancy of each of the flame retardant resin compositions according to Examples 1 to 24, and Comparative Example 1 to 16, the combustion specimen prepared by the above-mentioned method was tested in accordance with UL94 test defined by U.S. UNDERWRITERS LABORATORIES INC. (UL). The UL94V is a method of evaluating flame retardancy on the basis of the residual flame time and dripping properties after causing a specimen having a vertically-held predetermined size to be in contact with flame of a burner for 10 seconds. In order to achieve the flame retardancy of V-0, V-1, and V-2, it is necessary to satisfy the criteria shown in the following Table 5.

(Evaluation Results of Flame Retardancy)

The evaluation results of flame retardancy are shown in the following Table 1 to Table 4. Evaluation of each of the flame retardant resin compositions according to Examples 1 to 24 was V-0, and evaluation of each of the flame retardant resin composition according to Comparative Example 1 to 16 was V-1 to V-2. As the evaluation results of the flame retardancy, it was confirmed that the flame retardant resin compositions according to Examples 1 to 24 were satisfactory.

[Evaluation of Load Deflection Temperature (Heat Distortion Temperature)]

(Method of Evaluating Load Deflection Temperature (Heat Distortion Temperature))

For evaluation of the load deflection temperature (heat distortion temperature) of each of the flame retardant resin composition according to Examples 1 to 24 and Comparative Example 1 to 16, a strip-shaped molded article having a thickness of 3.1 mm was prepared and measured at a load of 4.6 kgf/cm$^2$ in accordance with ASTM D648.

(Evaluation Results of Load Deflection Temperature (Heat Distortion Temperature))

The evaluation results of the load deflection temperature (heat distortion temperature) were shown in the following Table 1 to Table 4. The load deflection temperatures (heat distortion temperatures) of the flame retardant resin compositions according to Examples 1 to 24 were 52° C. to 140° C., and the load deflection temperatures (heat distortion temperatures) of the flame retardant resin compositions according to Comparative Example 1 to 16 were 52° C. to 145° C. As the evaluation results of the load deflection temperature (heat distortion temperature), it was confirmed that each of the flame retardant resin compositions according to Examples 1 to 24 was at a level not causing actual damage.

[Evaluation of Flexural Modulus]

(Method of Evaluating Flexural Modulus)

The flexural modulus of each of the flame retardant resin compositions according to Examples 1 to 24 and Comparative Example 1 to 16 was evaluated by preparing a stripe-shaped molded product having a thickness of 3.1 mm in accordance with the ASTMD790 method. Then, the value of flexural modulus was obtained by the following formula.

$$\text{Flexural modulus } E = L^3/4bh^3 \times \Delta F/\Delta s$$

In the above-mentioned formula, L represents the distance between fulcrums, b represents the specimen width, h represents the specimen thickness, ΔF represents the change amount of the bending load, and Δs represents the change amount of deflection. The change amount was obtained by taking two arbitrary points from the tangent of the bending load-deflection curve.

(Evaluation Results of Flexural Modulus)

The evaluation results of the flexural modulus were shown in the following Table 1 to Table 4. The flexural moduli of the flame retardant resin compositions according to Examples 1 to 24 were 30,000 to 123,000, and the flexural moduli of the flame retardant resin compositions according to Comparative Example 1 to 16 were 29,000 to 107,000. As the evaluation results of the flexural modulus, it was confirmed that each of the flame retardant resin compositions according to Examples 1 to 24 was at a level not causing actual damage.

[Evaluation of MFR (Fluidity)]

(Method of Evaluating MFR (Fluidity))

MFR (fluidity) of each of the flame retardant resin compositions according to Examples 1 to 24 and Comparative Example 1 to 16 was evaluated by applying a certain weight to a flame retardant resin composition melted in a cylinder (heating cylinder) and obtaining the discharge amount (between marked lines) of the sample extruded from the orifice in terms of a weight (unit: g/10 min) per 10 minutes. The cylinder temperature was 280° C., and the load was 2.16 kg.

(Evaluation Results of MFR (Fluidity))

The evaluation results of MFR (fluidity) are shown in the following Table 1 to Table 2. MFRs (fluidity) of the flame retardant resin compositions according to Examples 1 to 13 were 10 to 28, and MFRs (fluidity) of the flame retardant resin compositions according to Comparative Examples 1 to 4 were 16 to 17. As the evaluation results of MFR (fluidity), it was confirmed that each of the flame retardant resin compositions according to Examples 1 to 13 was at a level not causing actual damage.

TABLE 1

|  |  |  | Example 1 | Example 2 | Example 3 | Example 4 | Example 5 | Example 6 | Example 7 |
|---|---|---|---|---|---|---|---|---|---|
| A component: Aromatic polycarbonate resin | A-1 | L-1225L | 60 |  | 60 |  |  |  |  |
|  | A-2 | Waste disk chemical cleaning product |  | 30 |  | 30 |  |  |  |
|  | A-3 | Recovered water bottle |  | 30 |  | 30 | 60 |  | 50 |
|  | A-4 | Recovered optical sheet |  |  |  |  |  | 60 |  |
| B component: Inorganic filler | B-1 | Chopped strand | 40 | 40 | 40 | 40 | 40 | 40 | 50 |
|  | B-2 | Flat glass |  |  |  |  |  |  |  |
|  | B-3 | HF105 manufactured by FUJI TALC INDUSTRIAL CO., LTD. |  |  |  |  |  |  |  |
| C component: Phosphate ester flame retardant | C-1 | CR-741 | 15 | 15 | 15 | 15 | 15 | 15 | 15 |
| D component: organic sulfonic acid flame retardant | D-1 | PSS-K | 0.1 | 0.1 | 0.1 | 0.1 | 0.1 | 0.1 | 0.1 |
|  | D-2 | PASS-K |  |  |  |  |  |  |  |
| E component: Drip preventing agent | E-1 | FA500H | 0.4 | 0.4 | 0.4 | 0.4 | 0.4 | 0.4 | 0.4 |
| F component: Polyorganosiloxane-containing graft copolymer | F-1 | S-2030 |  |  | 3 | 3 | 3 | 3 | 3 |
|  | F-2 | S-2001 |  |  |  |  |  |  |  |
|  | F-3 | SX-005 |  |  |  |  |  |  |  |
| Test | UL94 0.8 mm |  | V-0 | V-0 | V-0 | V-0 | V-0 | V-0 | V-0 |
|  |  |  | Example 8 | Example 9 | Example 10 | Example 11 | Example 12 | Example 13 |  |
| A component: Aromatic polycarbonate resin | A-1 | L-1225L |  |  |  |  |  |  |  |
|  | A-2 | Waste disk chemical cleaning product |  |  |  |  |  | 30 |  |
|  | A-3 | Recovered water bottle | 60 | 50 | 60 | 60 | 60 | 30 |  |
|  | A-4 | Recovered optical sheet |  |  |  |  |  |  |  |
| B component: Inorganic filler | B-1 | Chopped strand |  | 40 | 40 | 40 | 40 | 40 |  |
|  | B-2 | Flat glass | 40 |  |  |  |  |  |  |
|  | B-3 | HF105 manufactured by FUJI TALC INDUSTRIAL CO., LTD. |  |  | 10 |  |  |  |  |
| C component: Phosphate ester flame retardant | C-1 | CR-741 | 15 | 15 | 15 | 15 | 16 | 20 |  |
| D component: organic sulfonic acid flame retardant | D-1 | PSS-K | 0.1 | 0.1 | 0.1 | 0.1 |  | 0.1 |  |
|  | D-2 | PASS-K |  |  |  |  | 0.1 |  |  |
| E component: Drip preventing agent | E-1 | FA500H | 0.4 | 0.4 | 0.4 | 0.4 | 0.4 | 0.4 |  |
| F component: Polyorganosiloxane-containing graft copolymer | F-1 | S-2030 | 3 | 3 |  |  | 3 | 3 |  |
|  | F-2 | S-2001 |  |  |  | 3 |  |  |  |
|  | F-3 | SX-005 |  |  |  |  | 3 |  |  |
| Test | UL94 0.8 mm |  | V-0 | V-0 | V-0 | V-0 | V-0 | V-0 |  |

TABLE 1-continued

|  | First | Second | First | Second | First | Second | First | Second | First | Second | First | Second | First | Second |
|---|---|---|---|---|---|---|---|---|---|---|---|---|---|---|
| Combustion time (S) | 0 | 2 | 2 | 5− | 1 | 7 | 2 | 7 | 3 | 7 | 2 | 6 | 3 | 8 |
|  | 1 | 5 | 3 | 3 | 2 | 7 | 3 | 5 | 2 | 4 | 3 | 4 | 4 | 6 |
|  | 3 | 0 | 3 | 2 | 2 | 2 | 3 | 3 | 4 | 4 | 3 | 5 | 4 | 7 |
|  | 2 | 3− | 5 | 3− | 2 | 4 | 5 | 7 | 5 | 5 | 4 | 4 | 5 | 7 |
|  | 2 | 3− | 4 | 3− | 1 | 6 | 4 | 7 | 4 | 7 | 3 | 5 | 4 | 6 |
| Total combustion time | 8 | 13 | 17 | 16 | 8 | 26 | 17 | 29 | 18 | 27 | 15 | 24 | 20 | 34 |
| Total of first + second | 21 | | 33 | | 34 | | 46 | | 45 | | 39 | | 54 | |
| Load deflection temperature °C. | 93 | | 94 | | 95 | | 94 | | 93 | | 93 | | 98 | |
| Flexural modulus | 97000 | | 97000 | | 95000 | | 95000 | | 95000 | | 95000 | | 123000 | |
| MFR (fluidity) | 17 | | 17 | | 16 | | 16 | | 10 | | 17 | | 8 | |

|  | First | Second | First | Second | First | Second | First | Second | First | Second | First | Second |
|---|---|---|---|---|---|---|---|---|---|---|---|---|
| Combustion time (S) | 2 | 4 | 4 | 6 | 4 | 7 | 2 | 4 | 3 | 5 | 2 | 4 |
|  | 4 | 5 | 5 | 6 | 3 | 5 | 2 | 2 | 4 | 6 | 3 | 5 |
|  | 3 | 4 | 5 | 8 | 4 | 5 | 1 | 1 | 4 | 7 | 3 | 3 |
|  | 2 | 4 | 7 | 7 | 5 | 6 | 2 | 3 | 5 | 7 | 2 | 2 |
|  | 3 | 6 | 4 | 8 | 4 | 7 | 3 | 5 | 3 | 6 | 2 | 5 |
| Total combustion time | 14 | 23 | 25 | 35 | 20 | 30 | 10 | 15 | 19 | 31 | 12 | 19 |
| Total of first + second | 37 | | 60 | | 50 | | 25 | | 50 | | 31 | |
| Load deflection temperature °C. | 92 | | 95 | | 93 | | 93 | | 93 | | 75 | |
| Flexural modulus | 100000 | | 98000 | | 95000 | | 95000 | | 95000 | | 93000 | |
| MFR (fluidity) | 11 | | 14 | | 11 | | 11 | | 11 | | 28 | |

Notation of "−" after number representing combustion time = With drip and without cotton ignition
Notation of "+" after number representing combustion time = With drip and cotton ignition

TABLE 2

|  |  |  | Comparison example 1 | Comparison example 2 | Comparison example 3 | Comparison example 4 |
|---|---|---|---|---|---|---|
| A component: Aromatic polycarbonate resin | A-1 | L-1225L | 30 |  | 30 |  |
|  | A-2 | Waste disk chemical cleaning product | 30 | 30 | 30 | 30 |
|  | A-3 | Recovered water bottle |  | 30 |  | 30 |
|  | A-4 | Recovered optical sheet |  |  |  |  |
| B component: Inorganic filler | B-1 | Chopped strand | 40 | 40 | 40 | 40 |
|  | B-2 | Flat glass |  |  |  |  |
|  | B-3 | HF105 manufactured by FUJI TALC INDUSTRIAL CO., LTD. |  |  |  |  |
| C component: Phosphate ester flame retardant | C-1 | CR-741 | 15 | 15 | 15 | 15 |
| D component: organic sulfonic acid flame retardant | D-1 | PSS-K |  |  |  |  |
|  | D-2 | PASS-K |  |  |  |  |

TABLE 2-continued

| | | | | | | | | |
|---|---|---|---|---|---|---|---|---|
| E component: Drip preventing agent | E-1 | FA500H | 0.4 | | 0.4 | | 0.4 | 0.4 |
| F component: Polyorganosiloxane-containing graft copolymer | F-1 | S-2030 | | | | | 3 | 3 |
| | F-2 | S-2001 | | | | | | |
| | F-3 | SX-005 | | | | | | |
| Test | Flame retardancy | UL94 0.8 mm | V-1 | | V-1 | | V-1 | V-1 |

| | First | Second | First | Second | First | Second | First | Second |
|---|---|---|---|---|---|---|---|---|
| Combustion time (S) | 6 | 13– | 4 | 22 | 4 | 15 | 5 | 12 |
| | 4 | 8 | 7 | 17– | 6 | 13 | 4 | 13 |
| | 5 | 11 | 5 | 14 | 5 | 19 | 4 | 20 |
| | 5 | 12– | 4 | 12– | 3 | 12 | 7 | 12 |
| | 4 | 10 | 8 | 10 | 6 | 6 | 6 | 11 |
| Total combustion time | 24 | 54 | 28 | 75 | 24 | 65 | 26 | 68 |
| Total of first + second | 78 | | 103 | | 89 | | 94 | |
| Load deflection temperature ° C. | 92 | | 94 | | 93 | | 94 | |
| Flexural modulus | 97000 | | 97000 | | 96000 | | 95000 | |
| MFR (fluidity) | 17 | | 17 | | 16 | | 17 | |

TABLE 3

| | | | Example 14 | Example 15 | Example 16 | Example 17 | Example 18 | Example 19 |
|---|---|---|---|---|---|---|---|---|
| A component: Aromatic polycarbonate resin | A-1 | L-1226L | 45 | 10 | 45 | 30 | 30 | 30 |
| | A-2 | Waste disk chemical cleaning product | 50 | 30 | 50 | 30 | 30 | 30 |
| | A-3 | Recovered water bottle | | | | | | |
| | A-4 | Recovered optical sheet | | | | | | |
| B component: Inorganic filler | B-1 | Chopped strand | 5 | 60 | 5 | 40 | 40 | 40 |
| | B-2 | Flat glass | | | | | | |
| | B-3 | HF105 manufactured by FUJI TALC INDUSTRIAL CO., LTD. | | | | | | |
| C component: Phosphate ester flame retardant | C-1 | CR-741 | 10 | 15 | 1 | 30 | 15 | 15 |
| D component: organic sulfonic acid flame retardant | D-1 | PSS-K | 0.1 | 0.1 | 0.1 | 0.1 | 0.1 | 2 |
| | D-2 | PASS-K | | | | | | |
| E component: Drip preventing agent | E-1 | FA500H | 0.4 | 0.4 | 0.4 | 0.4 | 0.4 | 0.4 |
| F component: Polyorganosiloxane-containing graft copolymer | F-1 | S-2030 | 3 | 3 | 3 | 3 | 3 | 3 |
| | F-2 | S 2001 | | | | | | |
| | F-3 | SX-005 | | | | | | |
| Test | Flame retardancy | UL94 0.8 mm | V-0 | V-0 | V-0 | V-0 | V-0 | V-0 |

| | | | Example 20 | Example 21 | Example 22 | Example 23 | Example 24 |
|---|---|---|---|---|---|---|---|
| A component: Aromatic polycarbonate resin | A-1 | L-1226L | 30 | 30 | 30 | 30 | 30 |
| | A-2 | Waste disk chemical cleaning product | 30 | 30 | 30 | 30 | 30 |
| | A-3 | Recovered water bottle | | | | | |

TABLE 3-continued

| | | | | | | | | | | | | |
|---|---|---|---|---|---|---|---|---|---|---|---|---|
| | | A-4 | Recovered optical sheet | | | | | | | | | |
| B component: Inorganic filler | | B-1 | Chopped strand | 40 | | 40 | | 40 | | 40 | | 40 |
| | | B-2 | Flat glass | | | | | | | | | |
| | | B-3 | HF105 manufactured by FUJI TALC INDUSTRIAL CO., LTD. | | | | | | | | | |
| C component: Phosphate ester flame retardant | | C-1 | CR-741 | 30 | | 30 | | 30 | | 30 | | 15 |
| D component: organic sulfonic acid flame retardant | | D-1 | PSS-K | 0.1 | | 0.1 | | 0.1 | | 0.1 | | 0.1 |
| | | D-2 | PASS-K | | | | | | | | | |
| E component: Drip preventing agent | | E-1 | FA500H | 0.4 | | 0.4 | | 0.05 | | 1.5 | | 0.2 |
| F component: Polyorganosiloxane-containing graft copolymer | | F-1 | S-2030 | 0.1 | | 10 | | 3 | | 3 | | 3 |
| | | F-2 | S 2001 | | | | | | | | | |
| | | F-3 | SX-005 | | | | | | | | | |
| Test | | Flame retardancy | UL94 0.8 mm | V-0 | | V-0 | | V-0 | | V-0 | | V-0 |

| | First | Second | First | Second | First | Second | First | Second | First | Second | First | Second |
|---|---|---|---|---|---|---|---|---|---|---|---|---|
| Combustion time (S) | 5 | 4 | 4 | 8 | 8 | 7 | 2 | 3– | 2 | 7 | 5 | 8 |
| | 6 | 3 | 3 | 6– | 9 | 6 | 1 | 4– | 5 | 6 | 2 | 9 |
| | 2 | 7 | 2 | 9– | 7 | 9 | 2 | 2 | 4 | 3 | 4 | 5 |
| | 3 | 7 | 2 | 9– | 9 | 8 | 2 | 1 | 2 | 5 | 3 | 6 |
| | 4 | 5 | 5 | 8 | 8 | 8 | 1 | 2 | 3 | 7 | 2 | 8 |
| Total combustion time | 20 | 26 | 16 | 40 | 41 | 38 | 8 | 12 | 16 | 28 | 16 | 36 |
| Total of first + second | 46 | | 56 | | 79 | | 20 | | 44 | | 52 | |
| Load deflection temperature ° C. | 106 | | 93 | | 140 | | 53 | | 92 | | 93 | |
| Flexural modulus | 29000 | | 145000 | | 30000 | | 97000 | | 101000 | | 97000 | |

| | | First | Second | First | Second | First | Second | First | Second | First | Second |
|---|---|---|---|---|---|---|---|---|---|---|---|
| | Combustion time (S) | 1 | 3– | 3 | 3 | 2– | 4 | 6 | 6 | 3 | 3 |
| | | 2 | 2 | 4 | 4– | 3– | 5– | 7 | 5 | 1 | 7 |
| | | 1 | 2 | 2 | 2– | 1 | 3 | 8 | 8– | 3 | 2 |
| | | 1 | 1 | 5 | 1– | 2– | 5– | 5 | 9– | 1 | 6 |
| | | 2 | 4– | 1 | 2 | 3– | 2– | 9 | 9– | 4 | 7 |
| | Total combustion time | 7 | 12 | 15 | 12 | 11 | 19 | 35 | 37 | 36 | 25 |
| | Total of first + second | 19 | | 27 | | 30 | | 72 | | 61 | |
| | Load deflection temperature ° C. | 52 | | 52 | | 53 | | 54 | | 95 | |
| | Flexural modulus | 96000 | | 93000 | | 97000 | | 97000 | | 96000 | |

Notation of "–" after number representing combustion time = With drip and without cotton ignition
Notation of "+" after number representing combustion time = With drip and cotton ignition

TABLE 4

| | | | Comparison example 5 | Comparison example 6 | Comparison example 7 | Comparison example 8 | Comparison example 9 | Comparison example 10 |
|---|---|---|---|---|---|---|---|---|
| A component: Aromatic polycarbonate resin | A-1 | L-1225L | 45 | 10 | 45 | 30 | 30 | 30 |
| | A-2 | Waste disk chemical cleaning product | 50 | 30 | 50 | 30 | 30 | 30 |
| | A-3 | Recovered water bottle | | | | | | |
| | A-4 | Recovered optical sheet | | | | | | |
| B component: Inorganic filler | B-1 | Chopped strand | 5 | 60 | 5 | 40 | 40 | 40 |
| | B-2 | Flat glass | | | | | | |
| | B-3 | HF105 manufactured by FUJI TALC INDUSTRIAL CO., LTD. | | | | | | |
| C component: Phosphate ester flame retardant | C-1 | CR-741 | 10 | 15 | 1 | 30 | 15 | 15 |
| D component: organic sulfonic acid flame retardant | D-1 | PSS-K | | | | | | |
| | D-2 | PASS-K | | | | | | |
| E component: Drip preventing agent | E-1 | FA500H | 0.4 | 0.4 | 0.4 | 0.4 | 0.4 | 0.4 |
| F component: Polyorganosiloxane-containing graft copolymer | F-1 | S-2030 | 3 | 3 | 3 | 3 | 3 | 3 |
| | F-2 | S-2001 | | | | | | |
| | F-3 | SX-005 | | | | | | |
| Test | Flame retardancy | UL94 0.8 mm | V-1 | V-1 | V-1 | V-1 | V-1 | V-1 |

| | | | Comparison example 11 | Comparison example 12 | Comparison example 13 | Comparison example 14 | Comparison example 15 | Comparison example 16 |
|---|---|---|---|---|---|---|---|---|
| A component: Aromatic polycarbonate resin | A-1 | L-1225L | 30 | 30 | 30 | 30 | 30 | 60 |
| | A-2 | Waste disk chemical cleaning product | 30 | 30 | 30 | 30 | 30 | |
| | A-3 | Recovered water bottle | | | | | | |
| | A-4 | Recovered optical sheet | | | | | | |
| B component: Inorganic filler | B-1 | Chopped strand | 40 | 40 | 40 | 40 | 40 | 40 |
| | B-2 | Flat glass | | | | | | |
| | B-3 | HF105 manufactured by FUJI TALC INDUSTRIAL CO., LTD. | | | | | | |
| C component: Phosphate ester flame retardant | C-1 | CR-741 | 30 | 30 | 30 | 30 | 15 | |
| D component: organic sulfonic acid flame retardant | D-1 | PSS-K | | | | | 3 | 0.3 |
| | D-2 | PASS-K | | | | | | |
| E component: Drip preventing agent | E-1 | FA500H | 0.4 | 0.4 | 0.05 | 1.5 | 0.4 | 0.3 |
| F component: Polyorganosiloxane-containing graft copolymer | F-1 | S-2030 | 0.1 | 10 | 3 | 3 | | |
| | F-2 | S-2001 | | | | | | |
| | F-3 | SX-005 | | | | | | |
| Test | Flame retardancy | UL94 0.8 mm | V-1 | V-1 | V-1 | V-1 | V-2 | V-2 |

TABLE 4-continued

| | First | Second | First | Second | First | Second | First | Second | First | Second | First | Second |
|---|---|---|---|---|---|---|---|---|---|---|---|---|
| Combustion time (S) | 7 | 5 | 4 | 11 | 8 | 13 | 3 | 3 | 3 | 7 | 3 | 7 |
| | 3 | 11 | 3 | 9− | 11 | 10 | 5 | 11− | 4 | 11 | 4 | 11 |
| | 3 | 12 | 2 | 12 | 8 | 21 | 4 | 2 | 4 | 3 | 4 | 3 |
| | 9 | 7 | 5 | 8− | 9 | 15 | 1 | 9− | 3 | 12 | 3 | 12 |
| | 5 | 13 | 4 | 10 | 5 | 28 | 2 | 14− | 3 | 7 | 3 | 7 |
| Total combustion time | 27 | 48 | 18 | 50 | 41 | 87 | 15 | 39 | 17 | 40 | 17 | 40 |
| Total of first + second | 75 | | 68 | | 128 | | 54 | | 57 | | 57 | |
| Load deflection temperature ° C. | 104 | | 95 | | 141 | | 53 | | 93 | | 92 | |
| Flexural modulus | 29000 | | 14000 | | 30000 | | 96000 | | 107000 | | 105000 | |

| | | First | Second | First | Second | First | Second | First | Second | First | Second | First | Second |
|---|---|---|---|---|---|---|---|---|---|---|---|---|---|
| | Combustion time (S) | 2 | 11− | 4 | 8 | 2− | 4− | 7 | 4 | 11 | 28 | 6+ | 3 |
| | | 3 | 4− | 8 | 4− | 2− | 5− | 8 | 7 | 8 | 19 | 5+ | 0 |
| | | 1 | 13 | 1 | 11 | 3− | 16− | 13 | 8− | 15 | 5+ | 6+ | 2 |
| | | 1 | 2− | 5 | 1− | 2− | 11− | 5 | 9− | 21 | 9 | 8+ | 5 |
| | | 3 | 9 | 1 | 14 | 3− | 2− | 12 | 3− | 7 | 19 | 11+ | 10 |
| | Total combustion time | 10 | 39 | 19 | 36 | 12 | 38 | 45 | 31 | 62 | 80 | 36 | 20 |
| | Total of first + second | 49 | | 57 | | 50 | | 76 | | 142 | | 56 | |
| | Load deflection temperature ° C. | 55 | | 52 | | 54 | | 54 | | 93 | | 145 | |
| | Flexural modulus | 98000 | | 100000 | | 97000 | | 95000 | | 107000 | | 107000 | |

TABLE 5

UL94V standard and determination criteria

| | | Class category | | |
|---|---|---|---|---|
| | | V-0 | V-1 | V-2 |
| Determination criteria | Combustion time after first contact with flame (S) | ≤10 | ≤30 | ≤30 |
| | Combustion time after second contact with flame (S) | ≤10 | ≤30 | ≤30 |
| | Total combustion time of five components | ≤50 | ≤250 | ≤250 |
| | Combustion time of each specimen + glowing time (S) | ≤30 | ≤60 | ≤60 |
| | Combustion reaches clamp | No | No | No |
| | Cotton ignites by dropping | No | No | Yes |

The invention claimed is:

1. A flame retardant resin composition, comprising:
an aromatic polycarbonate resin, wherein the aromatic polycarbonate resin comprises a recovered polycarbonate resin, wherein a content of the recovered polycarbonate resin is from 1 to less than 100 mass % to the total mass of the aromatic polycarbonate resin, and wherein the recovered polycarbonate resin comprises a blend of a polycarbonate and at least one polymer selected from the group consisting of a polyolefin, polypropylene, and polyethylene;
an inorganic filler;
a phosphate ester flame retardant;
an organic sulfonic acid flame retardant;
a drip preventing agent; and
optionally a polyorganosiloxane-containing graft copolymer, wherein
a content of the aromatic polycarbonate resin is 40 to 70 pts.mass to 30 to 60 pts.mass of the inorganic filler,
a content of the phosphate ester flame retardant, a content of the organic sulfonic acid flame retardant, a content of the drip preventing agent, and a content of the polyorganosiloxane-containing graft copolymer are respectively 1 to 30 pts.mass, 0.01 to 2.5 pts.mass, 0.05 to 1.5 pts.mass, and 0 to 10 pts.mass to the total 100 pts.mass of the aromatic polycarbonate resin and the inorganic filler, and
the organic sulfonic acid flame retardant contains 0.1 to 10 mol % of a sulfonic acid group and/or a metal sulfonate group.

2. The flame retardant resin composition according to claim 1, wherein
the recovered polycarbonate resin comprises at least one substituent selected from the group consisting of a hydroxyl group, a phosphate group, a phosphate base, a sulfonium base, a diazonium base, an iodonium base, and a carboxyl group.

3. The flame retardant resin composition according to claim 1, wherein
the recovered polycarbonate resin is obtained from at least one object selected from the group consisting of an optical disk, an optical sheet, a headlight, a water bottle, a baby bottle, and a building material sheet.

4. The flame retardant resin composition according to claim 1, wherein
the recovered polycarbonate resin is obtained from a used optical disk or a waste optical disk to which an attached material is attached, the attached material being selected from the group consisting of a metal layer, a recording material layer, an adhesive layer, a label, and a surface-hardened layer.

5. The flame retardant resin composition according to claim 1, wherein
the recovered polycarbonate resin is obtained by separating and removing an attached material from a used optical disk or a waste optical disk to which the attached material is attached, the attached material being selected from the group consisting of a metal layer, a recording material layer, an adhesive layer, a label, and a surface-hardened layer.

6. The flame retardant resin composition according to claim 1, wherein
the inorganic filler includes at least one material selected from the group consisting of glass fiber, a glass powder, mica, talc, and carbon fiber.

7. The flame retardant resin composition according to claim 1, wherein
the organic sulfonic acid flame retardant comprises an organic sulfonic acid compound having a weight-average molecular weight of not less than 30,000 in terms of polystyrene.

8. The flame retardant resin composition according to claim 1, wherein the content of the organic sulfonic acid flame retardant is 0.08 to 1.1 pts.mass.

9. The flame retardant resin composition according to claim 1, wherein the organic sulfonic acid flame retardant comprises a sulfonated aromatic polymer.

10. The flame retardant resin composition according to claim 1, wherein the content of the polyorganosiloxane-containing graft copolymer is 0.5 to 8 pts.mass.

11. The flame retardant resin composition according to claim 1, wherein the aromatic polycarbonate resin comprises a branched aromatic polycarbonate resin.

12. The flame retardant resin composition according to claim 10, wherein an amount of the branched aromatic polycarbonate resin in the aromatic polycarbonate resin is 10 to 100 mass %.

13. The flame retardant resin composition according to claim 1, wherein the aromatic polycarbonate resin comprises an aromatic polycarbonate-polyorganosiloxane copolymer.

* * * * *